United States Patent
Okude et al.

(10) Patent No.: US 7,165,527 B2
(45) Date of Patent: Jan. 23, 2007

(54) CONTROL DEVICE FOR A DIESEL ENGINE

(75) Inventors: Keiichi Okude, Minato-ku (JP); Shiroh Shiino, Minato-ku (JP); Takeshi Moriya, Minato-ku (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 0 days.

(21) Appl. No.: 11/393,571

(22) Filed: Mar. 30, 2006

(65) Prior Publication Data

US 2006/0219214 A1    Oct. 5, 2006

(30) Foreign Application Priority Data

Mar. 30, 2005    (JP)    ............................. 2005-098005

(51) Int. Cl.
*F02D 41/40*    (2006.01)
*F02D 35/02*    (2006.01)
*F02B 1/12*    (2006.01)

(52) U.S. Cl. ...................... 123/299; 123/435; 123/446; 123/458; 123/464

(58) Field of Classification Search ................ 123/299, 123/300, 435, 446, 457, 458, 464
See application file for complete search history.

(56) References Cited

U.S. PATENT DOCUMENTS

| | | | |
|---|---|---|---|
| 6,990,949 B2 * | 1/2006 | Kataoka et al. | 123/299 |
| 2002/0040692 A1 * | 4/2002 | LaPointe et al. | 123/27 GE |
| 2003/0056751 A1 * | 3/2003 | Sukegawa et al. | 123/435 |

FOREIGN PATENT DOCUMENTS

| | | |
|---|---|---|
| JP | 2002-201991 | 7/2002 |
| JP | 2003-286879 | 10/2003 |

* cited by examiner

*Primary Examiner*—T. M. Argenbright
(74) *Attorney, Agent, or Firm*—Rossi, Kimms & McDowell LLP

(57) ABSTRACT

There are provided a diesel engine that injects fuel into air compressed in cylinders and combusts the fuel by spontaneous ignition, and a control unit that sets the fuel injection timing to an earlier time point than the compression top dead center to premix air and fuel and combusts the air-fuel mixture compressed in the cylinders by spontaneous ignition. The control unit injects the fuel to be injected in an early stage in a plurality of stages according to the operation state of the engine and individually adjusts the injection pressures of their respective stages according to the gas density and the gas temperature in the corresponding cylinder.

7 Claims, 7 Drawing Sheets

CONTROL DEVICE FOR A DIESEL ENGINE

BACKGROUND OF THE INVENTION

1. Field of the Invention

The present invention relates to a control device for a diesel engine, which advances a fuel injection timing to be earlier than in diesel combustion, and carries out the Premixed Compression Ignition that injects fuel in a plurality of stages.

2. Description of the Related Art

Generally in the diesel combustion (diffusion combustion), air is taken into cylinders to be compressed. Fuel is then injected into the compressed air to be combusted by spontaneous ignition. Aside from this method, there is another combustion method, namely Homogeneous Charge Compression Ignition (HCCI) combustion, which advances the fuel injection timing considerably to elongate an ignition delay period. This method produces a lean mixture and combusts the mixture at low temperature, thereby suppressing the generation of NOx and smoke.

In the process of the HCCI combustion, when the injection quantity grows as the demanded load is increased, the fuel is pre-ignited, and combustion is intensified, which causes knocking. There also arouses the fear that a large quantity of NOx and smoke might be produced. To solve these troubles, there is a premixed compression ignition method that advances the fuel injection timing to be much earlier than in diesel combustion, but injects fuel in a plurality of stages. For example, some of the total fuel quantity is injected in a plurality of stages with early timing in a compression stroke, and the rest is injected near the compression top dead center.

The fuel injected with the early timing in the compression stroke, however, reaches as far as a cylinder wall surface, which triggers oil dilution and smoke. This is because a piston is still located in a low position at this point, and the atmosphere density (gas density) in the corresponding cylinder is low. In this light, there are disclosed the technology of injecting low-pressure fuel so that the fuel is prevented from reaching the cylinder wall surfaces (Unexamined Japanese Patent Publication No. 2002-201991) and the technology created in light of the gas density in the corresponding cylinder in relation to the fuel injected with the early timing (Unexamined Japanese Patent Publication No. 2003-286879).

According to the technology disclosed in Publication No. 2002-201991, an injection pressure is controlled by means of a fuel injector having two kinds of common rails, that is, low-pressure and high-pressure common rails. If the injection is performed with respect to fuel supplied from the low-pressure common rail in a plurality of stages, the premixed compression ignition method can be actualized.

However, the penetration of fuel spray is successively increased or decreased according to atmosphere in the cylinder. Unless the injection pressure is changed according to the state in the cylinder at the time of injection, it is impossible to actually prevent the fuel from reaching the cylinder wall surface. In other words, when the fuel is injected by stages, there is supposed to be the optimum injection pressure for each injection. According to the technology disclosed in Publication No. 2002-201991, however, the injection pressures of their respective stages are all set to equal pressures. This causes the problem that especially the fuel injected at the first stage is liable to reach the cylinder wall surface. Evaluation of the quantity of the fuel that adheres to the wall surface in the above-described technology relates to post injection, and is not applied with main injection taken into account. Such evaluation is hard to apply in case that all fuel is combusted in the inside of cylinders.

There is one idea, as shown in the technology disclosed in Publication No. 2003-286879, that the technology of controlling an injection pressure and the like in consideration of gas density in the corresponding cylinder is combined with the technology described in Publication No. 2002-201991. However, without consideration of atmosphere temperature (gas temperature) in the cylinder in addition to the gas density, the fuel spray penetration does not follow actual conditions, and the quantity of the fuel that actually adheres to the cylinder wall surface cannot be evaluated. This is because an increase in capacity of the cylinder not only reduces the gas density but also lowers the gas temperature, and the fuel spray penetration in such a case is on the increase, which further enhances the possibility that the fuel reaches the cylinder wall surface. Another reason is that a rise in the intake temperature reduces the gas density but increases the gas temperature, so that the fuel spray penetration in this case is on the decline due to fuel evaporation, which decreases the possibility that the fuel reaches the cylinder wall surface.

SUMMARY OF THE INVENTION

The present invention has been made in light of the above-mentioned problems. It is an object of the present invention to provide a control device for a diesel engine, which is capable of setting optimum pressures that vary depending on the respective injections in consideration of fuel spray penetration that suits actual conditions, and a method thereof.

In order to accomplish the above object, the control device for a diesel engine according to the present invention has a diesel engine that injects fuel to air compressed in each cylinder to combust the fuel by spontaneous ignition, and control means for setting fuel injection timing to an earlier time point than compression top dead center to premix air and fuel, and combusting an air-fuel mixture compressed in the corresponding cylinder by spontaneous ignition. The control means is characterized by injecting fuel to be injected in an early stage (hereinafter referred to as early-injected fuel) in a plurality of stages depending on the operation state of the engine, and adjusting injection pressures of the respective stages according to gas density and gas temperature in the corresponding cylinder.

By so doing, the injection pressures of the respective stages are not set to equal pressures but to pressures that vary depending on the respective injections. Furthermore, since the injection pressures of the respective stages are adjusted according to the gas density and the gas temperature in the cylinder, the fuel spray penetration that suits the actual conditions is taken into account. As a consequence, the injection of each stage can be set at a highest suitable pressure in a range where fuel spray does not adhere to a wall surface of the cylinder. This makes it possible to achieve suppression of oil dilution, smoke reduction, and an improvement in combustion efficiency.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

An embodiment of the present invention will be described below with reference to the drawings.

Figure 1:
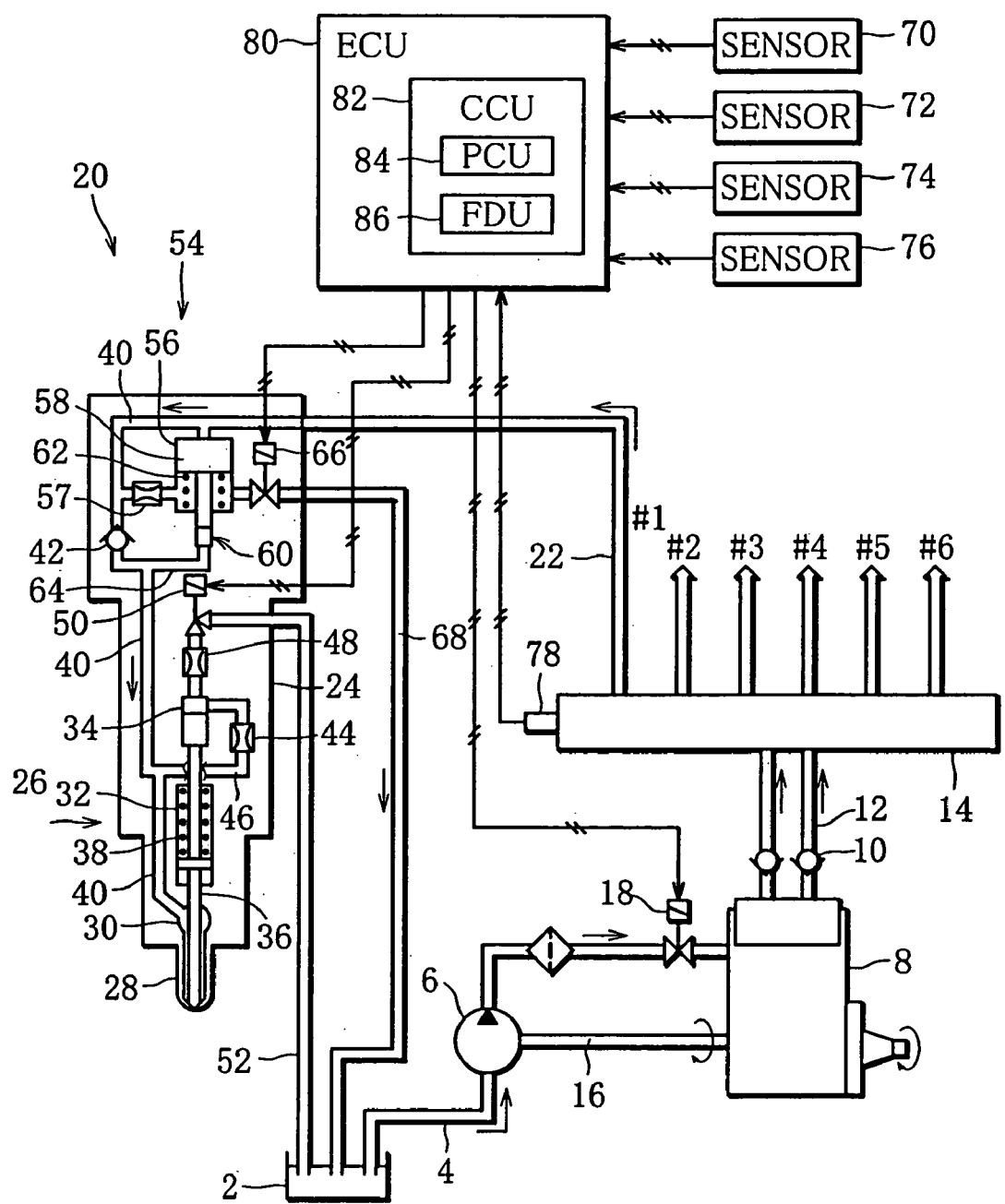
FIG. 1 is a view showing an entire constitution of a common rail-type fuel injector employing a control device for a diesel engine according to one embodiment of the present invention.

FIG. 1 is a view showing an entire constitution of a fuel injector with a common rail. A control device for a diesel engine according to the present invention is applied to the injector.

A vehicle equipped with the diesel engine (hereinafter simply referred to as engine) includes a fuel tank 2. The tank 2 is connected to a feed pump 6 through a fuel passage 4. The pump 6 is connected to a supply pump 8. The pump 8 is provided with an electromagnetic adjusting valve 18 and connected to a common rail 14 through a pair of fuel passages 12 with respective check valves 10. The pumps 6 and 8 are formed integrally and activated by engine through a drive shaft 16.

Fuel contained in the tank 2 is pumped up by the pump 6 and supplied to the pump 8. The fuel is then pressurized in the pump 8 and supplied to the common rail 14. Suction amount of the fuel supplied to the pump 8 is regulated by the opening of the adjusting valve 18, and discharge amount of the fuel discharged from the pump 8 is also regulated accordingly, to thereby adjust fuel pressure in the common rail 14. Fuel injection valves 20 are connected to the common rail 14 through respective fuel passages 22. The injection valves 20 are arranged to face the inside of respective cylinders. Each of the injection valves 20 has an injection unit 26 for controlling fuel injection into the corresponding cylinder and a pressure-boosting unit 54 for previously pressure-boosting the fuel to be supplied to the unit 26.

In the injection unit 26, there are formed an injection hole 28, a fuel pool 30, a spring chamber 32 and a pressure chamber 34 in the order located from the tip end of a valve body 24. A needle valve 36 is disposed from the injection hole 28 through the pressure chamber 34. The valve 36 is biased downward by biasing force of a spring 38 located in the chamber 32. The fuel pool 30 is connected to one end of a supply passage 40. Connected to the other end of the supply passage 40 is the corresponding fuel passage 22. A check valve 42 is interposed in the supply passage 40. The fuel supplied from the fuel passage 22 is guided through the supply passage 40 and the fuel pool 30 to the injection hole 28.

In the supply passage 40, one end of a pressure passage 46 with an orifice 44 is connected to a proper position located downstream from an installation position of the valve 42. The other end of the pressure passage 46 is connected to an upper portion of the pressure chamber 34. Therefore, the fuel pressure of the supply passage 40 acts as back pressure upon an upper surface of the valve 36 in the pressure chamber 34, and upward pressure acts upon the valve 36 in the fuel pool 30. A resultant force of the back pressure and the biasing force of the spring 38 exceed the fuel pressure acting upon the fuel pool 30. The valve 36 in this case is biased downward to be pressed against the injection hole 28 to be maintained in a closing position.

An electromagnetic injection control valve 50 is connected through an orifice 48 to the upper portion of the pressure chamber 34. The control valve 50 is connected through a return passage 52 to the tank 2. In response to the opening of the control valve 50, the fuel contained in the pressure chamber 34 is collected in the tank 2 through the return passage 52. By so doing, the back pressure is drastically reduced, and the valve 36 is biased upward to be switched to an opening position.

The pressure-boosting unit 54 is disposed on the upper side of the injection unit 26, and includes a cylinder 56 made up of a large diameter portion and a small diameter portion. A pressure-boosting piston 58 is disposed in the cylinder 56 so as to be movable in a vertical direction. The piston 58 is also made up of a large diameter portion and a small diameter portion. A spring 62 in the cylinder 56 biases the lower side of the large diameter portion of the piston 58 in the downward direction.

The supply passage 40 and the cylinder 56 are connected to each other at three places. Specifically, in the supply passage 40, a portion upstream from the installation position of the valve 42 is connected to the upper side of the large diameter portion of the cylinder 56, and is at the same time connected to the lower side of the large diameter portion of the cylinder 56 through an orifice 57. Therefore, the fuel pressure of the supply passage 40 acts as back pressure upon the lower side of the large diameter portion of the piston 58. A portion downstream from the installation position of the valve 42 is connected to the lower side of the small diameter portion of the cylinder 56 through a pressure passage 64. A portion comparted by the lower side of the small diameter portion of the piston 58 is formed as a pressure chamber 60. A resultant force of the back pressure and the biasing force of the spring 62 exceed the fuel pressure that acts upon the upper side of the large diameter portion of the piston 58. The piston 58 in such a case is biased upward, and the pressure chamber 60 is maintained to have maximum capacity.

Connected to the lower side of the large diameter portion of the cylinder 56 is an electromagnetic pressure-boosting control valve 66. The control valve 66 is connected through a return passage 68 to the tank 2. In response to the opening of the control valve 66, the fuel contained in the lower side of the large diameter portion of the cylinder 56 is returned through the return passage 68 into the tank 2. When this is done, the back pressure is drastically decreased, and the piston 58 is biased downward, which reduces the capacity of the pressure chamber 60.

In the vehicle compartment, there are installed an input/output device, not shown, memories (ROM, RAM, etc.) for storing a control program, a control map, etc., a central processing unit (CPU), and an ECU (electrical control unit) 80 with a timer and the like. Connected to the input side of the ECU 80 are a sensor 70 for detecting temperature in an intake passage, a sensor 72 for detecting pressure in the intake passage, a sensor 74 for detecting a flow rate in the intake passage, a sensor 76 for detecting a $CO_2$ concentration in an exhaust passage, a sensor 78 for detecting the fuel pressure in the common rail 14, and other sensors including a sensor for detecting acceleration amount, a sensor for outputting a crank angle signal synchronized with engine revolution, etc. Connected to the output side of the ECU 80 are devices including the adjusting valve 18, the control valves 50 and 66, etc.

On the basis of variety of information about the engine operation state, the ECU 80 sets desired values of common rail pressure, fuel injection quantity, fuel injection timing, execution or non-execution of the fuel pressure boosting performed by the pressure-boosting unit 54, actuation timing of the unit 54, and the like. The ECU 80 then drive-controls the above-mentioned devices and performs fuel injection in an injection pressure waveform that is most suitable for the engine operation state.

To be more specific, when the fuel under the common rail pressure is injected directly toward the inside of each of the cylinders, the corresponding control valve 66 is brought into the closing position, whereas the control valve 50 is opened. By so doing, the fuel contained in the pressure chamber 34 is returned through the return passage 52 to the tank 2 side, and the valve 36 is biased upward. The fuel then starts to be injected from the injection hole 28. When the control valve 50 is closed thereafter, fuel circulation to the tank 2 is stopped, and the valve 36 is biased downward, which discontinues the fuel injection.

Figure 2:
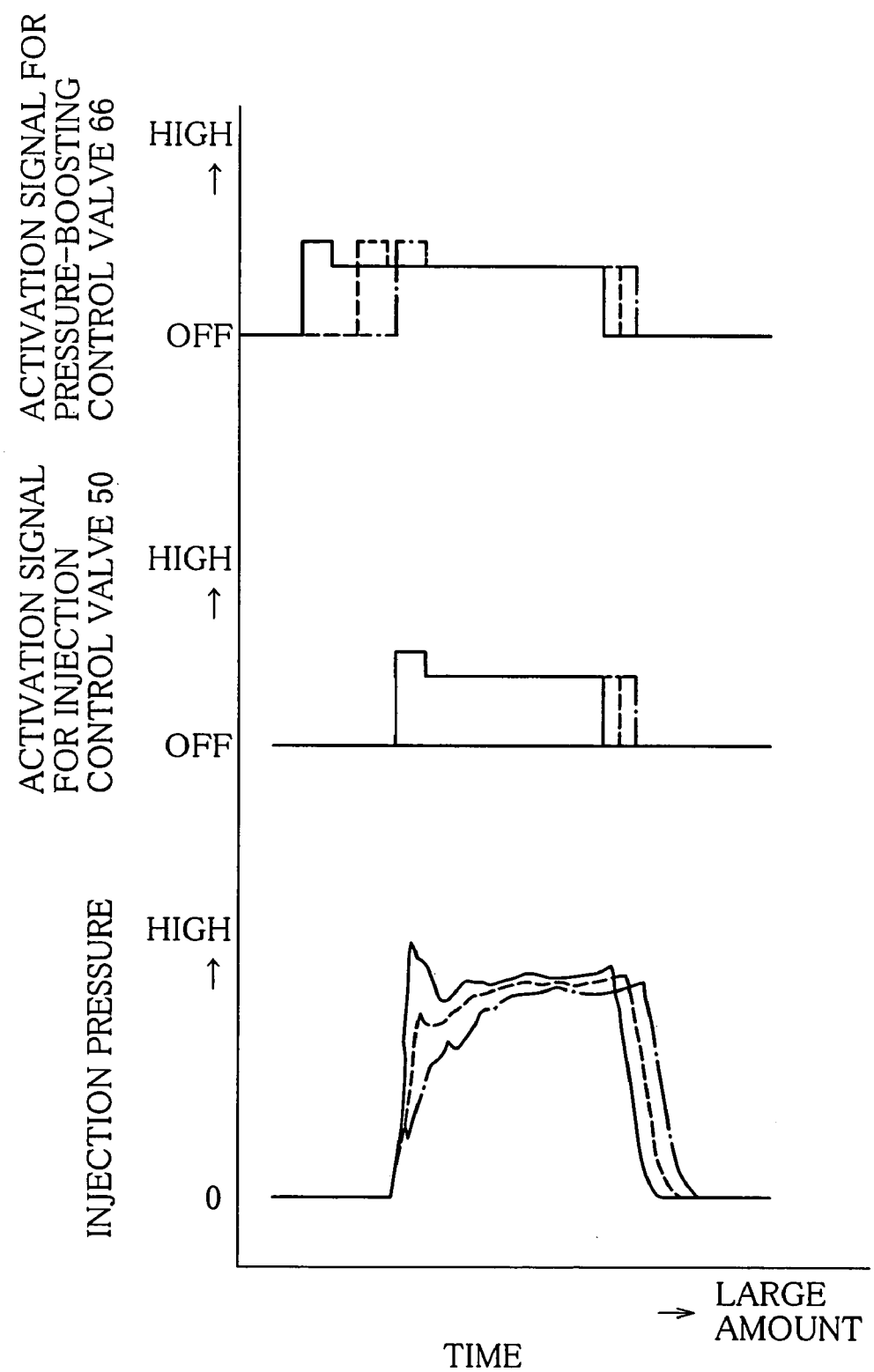
FIG. 2 is a view showing the relationship between actuation timing and an injection pressure waveform of a pressure-boosting unit.

When the fuel pressure boosting by the pressure-boosting unit 54 is carried out, the control valve 66 is opened or closed with prescribed timing in relation to the opening and closing of the control valve 50. In other words, as shown by a solid line in FIG. 2, the control valve 66 is opened with the prescribed timing prior to the opening of the control valve 50. In response to the opening of the control valve 66, the fuel contained in the lower side of the large diameter portion of the cylinder 56 is returned through the return passage 68 to the tank 2 side, and the piston 58 is biased downward. As a result, the fuel contained in the pressure chamber 60 is pressurized, and the fuel existing in the downstream side from the installation position of the valve 42 in the supply passage 40 is boosted to a higher pressure than the fuel pressure corresponding to the original common rail pressure.

Subsequently, once the control valve 50 is opened, the injection pressure rapidly rises in an early stage of the injection and is maintained higher than the common rail pressure. When the control valves 50 and 66 are later opened without interval, the injection pressure is drastically reduced, and the fuel injection is stopped. As shown by a broken line and a dashed line in FIG. 2, as the opening timing of the control valve 66 approaches the opening timing of the control valve 50, the rise of the injection pressure in the early stage of the injection becomes gentle, which creates a moderate injection pressure waveform.

The ECU 80 of the present embodiment carries out the premixed compression ignition method (hereinafter referred to as area II) that advances the fuel injection timing to be much earlier than in the diesel combustion (diffusion combustion) in a middle load range of the engine, and injects the fuel in a plurality of stages. In order to perform this ignition method, the ECU 80 is provided with a premixed compression ignition control unit (CCU: control means) 82. The ignition control unit 82 has an injection pressure control unit (PCU) 84 and an injection frequency determination unit (FDU) 86 to set optimum pressures that vary depending on the respective injections and optimum injection frequency. The ignition control unit 82 also controls the opening timing of the control valves 50 and 66 and the like on the basis of the acceleration amount, the engine revolution speed, etc., to thereby maintain an optimum injection pressure waveform all the time.

Figure 3:
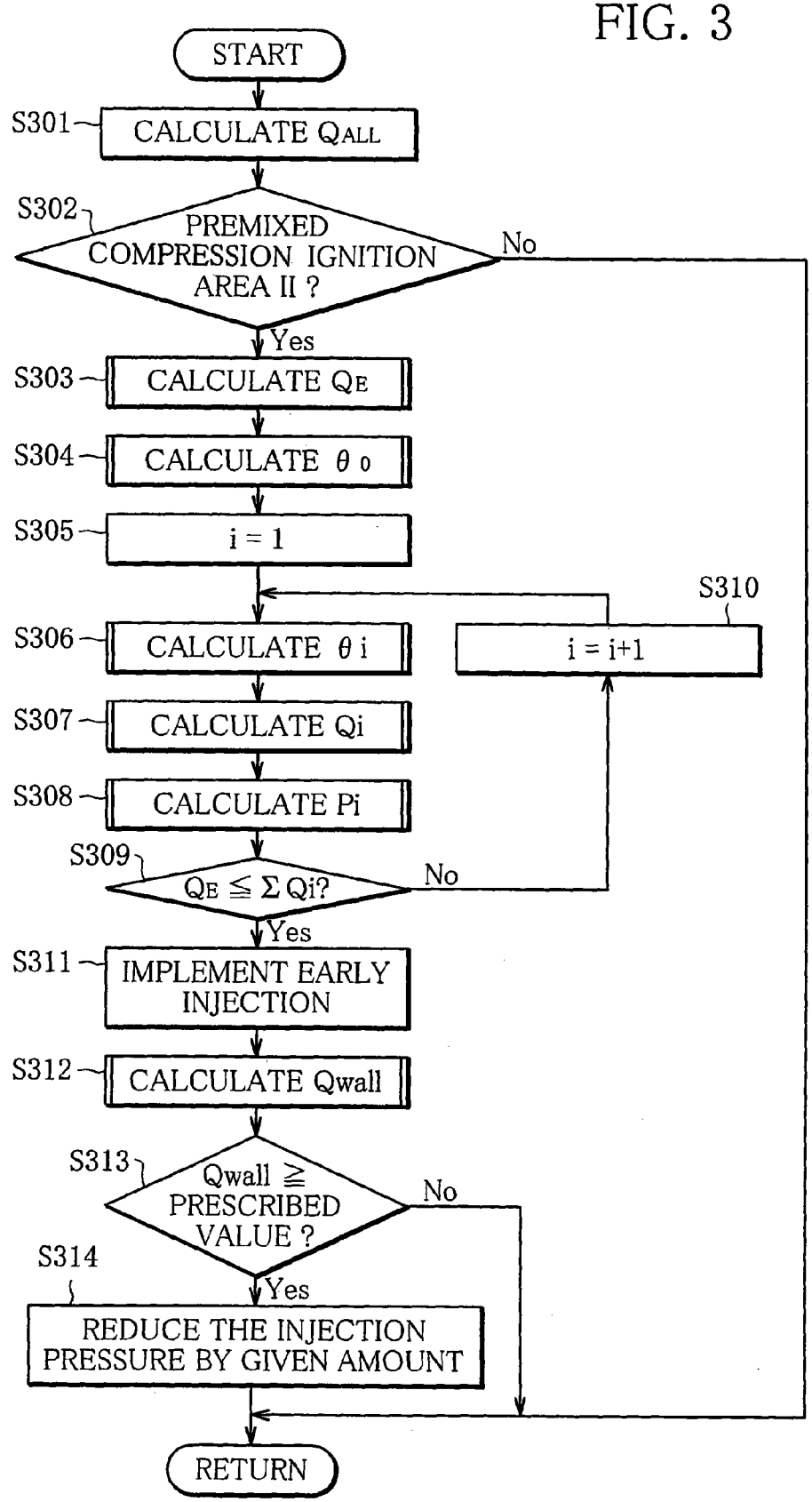
FIG. 3 is a flowchart showing a pressure control and frequency determination routine performed by an ECU.

FIG. 3 is a flowchart of the injection pressure control and the injection frequency determination which are carried out by the ignition control unit 82. Operation of the thus constructed control device for a diesel engine according to the present invention will be described below.

Figure 4:
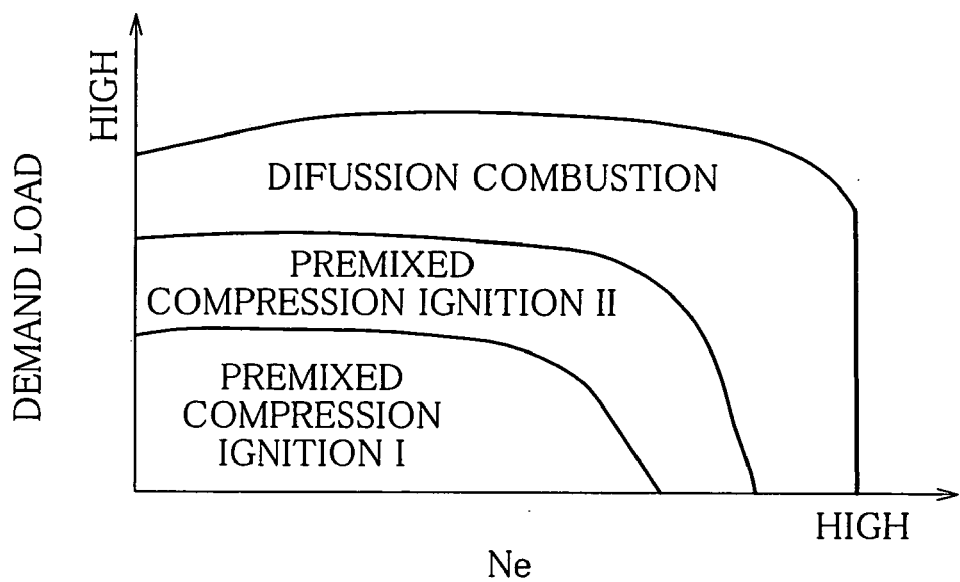
FIG. 4 is a view showing a map for switching combustion methods.

In Step S301 of FIG. 3, a total fuel quantity $Q_{ALL}$ that is injected toward the inside of the cylinder by the corresponding injection valve 20 is calculated. Step S302 makes a determination from a map as to whether a combustion area determined by the acceleration amount (demand load) and the engine revolution speed is the area II. If the determination is YES, that is, it is determined that the combustion area is the area II, the procedure advances to Step S303. Referring to the map, as illustrated in FIG. 4, the area II is selected when the demand load is moderate, and the early-injected fuel is injected just before the compression top dead center at least in twice. For example, if the fuel is divided to be injected in two successive stages, the fuel injection timing is set at 60 to 80 degrees BTDC in the previous stage, and at 20 to 40 degrees BTDC in the subsequent stage. The fuel quantity in the subsequent stage is set to fall in the range from about 50 percent to about 70 percent of the total fuel quantity $Q_{ALL}$.

By contrast, when Step S302 of FIG. 3 determines that the combustion area is not the area II, the procedure comes out of the routine, and a diffusion combustion area or a premixed compression ignition area I is selected. To be concrete, as illustrated in FIG. 4, when the demand load is low, the area I is selected, and the fuel is injected at an earlier point than the compression top dead center (for example, 20 to 50 degrees BTDC) without being divided. When the demand load is high, however, the diffusion combustion is selected, and the fuel is injected near the compression top dead center.

Figure 5A:
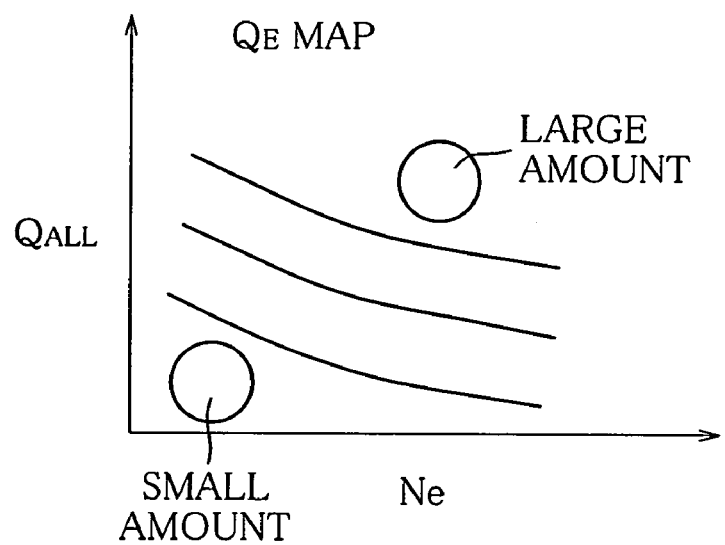
FIG. 5A is a view showing a map for setting a total injection quantity.
Figure 5B:
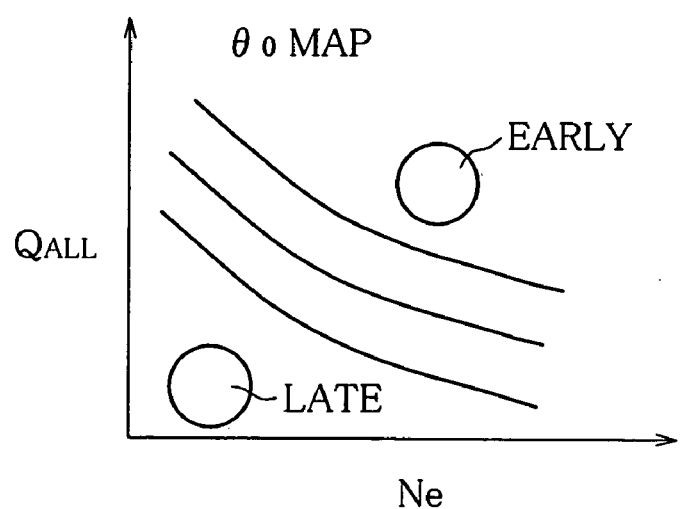
FIG. 5B is a view showing a map for setting reference injection timing.

Step S303 of FIG. 3 calculates a total injection quantity $Q_E$ of the early-injected fuel in the area II, whereas Step S304 calculates reference injection timing $\theta_0$ of the early-injected fuel. Both the total injection quantity $Q_E$ and reference injection timing $\theta_0$ of the early-injected fuel can be found from the map of the total fuel quantity $Q_{ALL}$ and the engine revolution speed Ne. Specifically, as the total fuel quantity $Q_{ALL}$ and the engine revolution speed Ne becomes higher, the total injection quantity $Q_E$ is increased accordingly (FIG. 5A), and the reference injection timing $\theta_0$ is advanced accordingly (FIG. 5B).

Once the total injection quantity $Q_E$ and the reference injection timing $\theta_0$ are found, Step S305 of FIG. 3 sets an index number i indicative of a stage to 1. The routine then proceeds to Step S306, which calculates the injection timing $\theta_i$ of the i-th (i=1, 2 . . . ) injection. The injection timing $\theta_i$ is used for calculating after-mentioned atmosphere density (gas density $\rho_i$) and atmosphere temperature (gas temperature Ti) in the corresponding cylinder. Step S306 determines proper intervals (for example, fixed time periods) between injections. Subsequently, the procedure advances to Steps S307 and S308.

Figure 6:
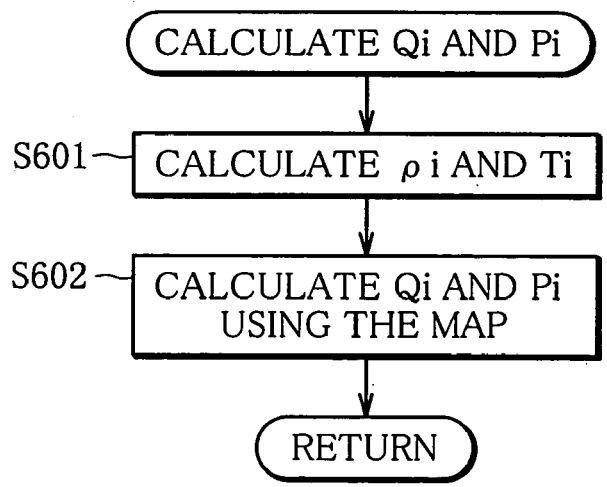
FIG. 6 is a flowchart showing a routine for calculating an injection quantity and injection pressure, which is performed by the ECU.
Figure 7A:
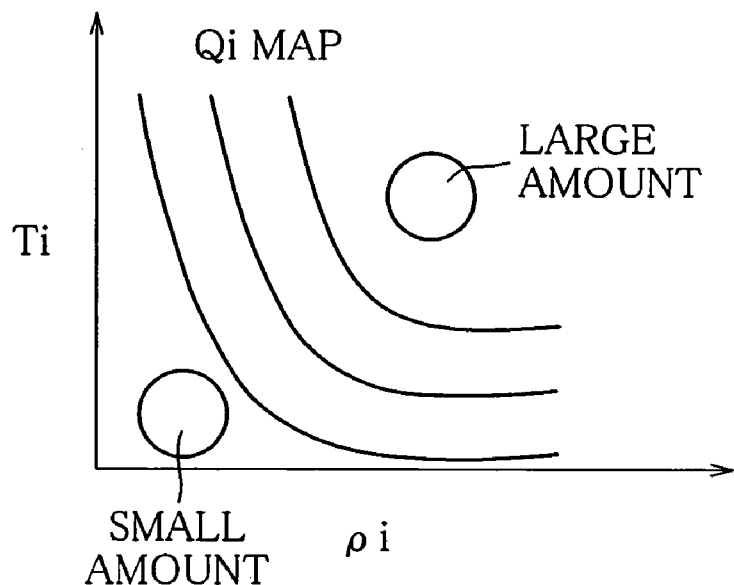
FIG. 7A is a view showing a map for setting a maximum injection quantity per injection in an early stage.

First, Step S307 calculates the injection quantity Qi of the i-th injection. The injection quantity Qi is a maximum injection quantity per injection and is found as shown in FIG. 6. In other words, Step S601 in FIG. 6 calculates the gas density ρi and the gas temperature Ti in the corresponding cylinder from the injection timing θi. In Step S602, the injection quantity Qi is calculated from the map of the gas density ρi and the gas temperature Ti. More concretely, the higher the gas temperature Ti and the gas density ρi in the cylinder grow, the more the injection quantity Qi is increased. Even if the gas temperature Ti is high, when the gas density ρi is lowered, the injection quantity Qi is lowered (FIG. 7A).

Figure 7B:
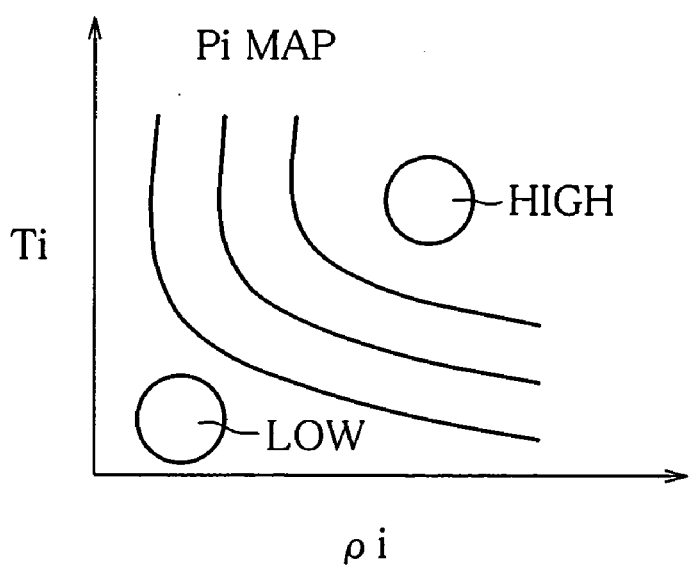
FIG. 7B is a view showing a map for setting injection pressure per injection in the early stage.

Step S308 of FIG. 3 calculates injection pressure Pi of the i-th injection by using the pressure control unit 84. The gas density ρi and the gas temperature Ti in the corresponding cylinder are calculated from the injection timing θi (Step S601), and the injection pressure Pi is calculated from a map of the gas density ρi and the gas temperature Ti (Step S602). The injection pressure Pi is reduced as the gas temperature Ti and the gas density ρi are lowered. To the contrary, as the gas temperature Ti and the gas density ρi are increased, the injection pressure Pi is raised. However, even if the gas temperature Ti is high, when the gas density ρi is lowered, the injection pressure Pi is reduced (FIG. 7B).

When the gas density equals $\rho_\theta$ in the condition where the crank angle indicative of the injection timing is θ, the gas density $\rho_\theta$ is expressed in the following formula (1). In the formula (1), $\rho_{IN}$ represents initial density of intake air, and is found by the following formula (2). $V_\theta$ in the formula (1) denotes cylinder capacity in the condition where the crank angle is θ, and is found by the following formula (3). In the formula (3), $L_\theta$ represents a piston position (distance from the top dead center) in the condition where the crank angle is θ. $L_\theta$ is found by the following formula (4).

$$\rho_\theta = \rho_{IN} \times (V_{BDC}/V_\theta) \quad (1)$$

$$\rho_{IN} = \rho_0 \times (T_0/T_{IN}) \times (P_{IN}/P_0) \quad (2)$$

$$V_\theta = (B^2 \times \pi/4) \times L_\theta + V_{TDC} \quad (3)$$

$$L_\theta = L_C + (S_t/2) - (S_t \cos \theta/2 + \sqrt{(L_C^2 - (S_t \sin \theta/2)^2)}) \quad (4)$$

In the formula (2), $\rho_0$ is intake air density in a standard condition (where temperature is $T_0$, and pressure is $P_0$). $T_0$ and $P_0$ denote temperature and pressure in a reference condition, respectively, and both are determined by composition of the intake air. $T_{IN}$ and $P_{IN}$ represent initial intake air temperature and pressure, respectively. $T_{IN}$ is detected by the sensor 70, and $P_{IN}$ by the sensor 72. $V_{BDC}$ in the formula (1) is the cylinder capacity in the condition where the piston is located at the bottom dead center. In the formula (3), B is a bore diameter of each cylinder, and $V_{TDC}$ is the cylinder capacity in the condition where the piston is located at the top dead center. In the formula (4), $L_C$ is the length of a connecting rod, and $S_t$ is stroke amount of the piston. All of them are determined by the specifications of the engine. When the gas temperature equals $T_\theta$ in the condition where the crank angle is θ, the following formula (5) is established. In the formula (5), k represents a ratio of specific heat of the intake air, and is determined by the composition and state of the intake air.

$$T_\theta = T_{IN} \times (V_{BDC}/V_\theta)^{k-1} \quad (5)$$

The gas density ρi and the gas temperature Ti are taken into consideration to achieve the true penetration of fuel spray.

Thereafter, Steps S306, S307 and S308 of FIG. 3 calculate the injection timing θi of the i-th (i=1, 2 . . . ) injection, the injection quantity Qi, and the injection pressure Pi, respectively. In the subsequent Step S309, the frequency determination unit 86 makes a determination as to whether addition amount of the injection quantity Qi is more than the total injection quantity $Q_E$. If the determination is YES, the procedure advances to Step S311.

To the contrary, if Step S309 determines that the addition amount of the injection quantity Qi is less than the total injection quantity $Q_E$, the number of times for division of the early-injected fuel can be further increased. Therefore, the procedure advances to Step S310, and the index number i is incremented by 1. In this case, Steps S306, S307 and S308 calculate injection timing θi+1 of the i+1-th injection, injection quantity Qi+1, and injection pressure Pi+1, respectively. Thereafter, Step S309 makes a determination as to whether the addition amount (ΣQi) equal to the injection quantity Q1+Q2+ . . . +Qi+Qi+1 is more than the total injection quantity $Q_E$. The number of times for division of the early-injected fuel continues to be increased until the determination is YES. In this manner, the injection pressures of the early-injected fuel in the area II are individually adjusted according to the gas densities ρi and the gas temperatures Ti in the respective cylinders.

Step S309 may determine the number of times for division by dividing the total injection quantity $Q_E$ by the first injection quantity Q1. If this is done, all the early injection quantities Qi are equal to each other (=Q1), so that only the injection pressures Pi are calculated. Moreover, in case that the addition amount of the injection quantity Qi does not reach the total injection quantity $Q_E$ even if the i exceeds predetermined number (imax), the routine comes out of the loop, and the rest of the fuel quantity (difference between $Q_E$ and the addition amount of Qi) may be used for main injection (injection near the top dead center). By so doing, control divergence is avoided without fail.

Figure 8:
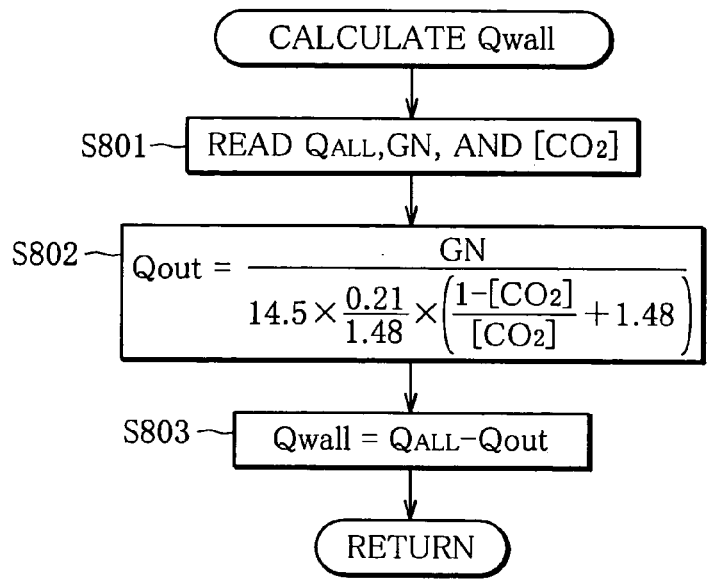
FIG. 8 is a flowchart showing a routine for calculating wall surface adhesion amount, which is performed by the ECU.

Thereafter, Step S311 performs early injection, and Step S312 calculates a fuel quantity that is likely to adhere to a wall surface of the corresponding cylinder (adhesion amount) $Q_{Wall}$. Specifically, as illustrated in FIG. 8, Step S801 reads the total fuel quantity $Q_{ALL}$, the air flow rate GN detected by the sensor 74, and the $CO_2$ concentration $[CO_2]$ detected by the sensor 76. Step S802 calculates a fuel quantity combusted in the cylinder (combustion quantity) $Q_{out}$ by a carbon balance method. A formula shown in Step S802 is established by substituting a formula for finding an excess air ratio λ from the $CO_2$ concentration $[CO_2]$ for λ in (Q=GN/(14.5×λ)) that is a general relational expression of the fuel injection quantity Q, the air flow rate GN and the excess air ratio λ. In this formula shown in Step S802, "14.5", "0.21", and "$[CO_2]$" are a theoretical mixture ratio, a volume ratio of $O_2$ in the atmosphere, and a volume ratio of $CO_2$ in exhaust air, respectively. "1.48" in the same formula is the constant number determined by fuel, and can be found by a formula, 1+(α/4), where α is an H/C ratio in the fuel. In the case of diesel oil, α equals 1.92.

In Step S803, the adhesion amount $Q_{Wall}$ is estimated from difference between the total fuel quantity $Q_{ALL}$ and the fuel quantity $Q_{out}$ as a fuel quantity that had not contributed to combustion. The procedure advances to Step S313 in FIG. 3. Step 313 makes a determination as to whether the estimated adhesion amount $Q_{Wall}$ is more than prescribed amount that is an acceptable value of the adhesion amount. If the determination is YES, that is, if it is determined that the adhesion amount $Q_{Wall}$ is more than the prescribed amount, the procedure advances to Step S314. The pressure control unit 84 then corrects the injection pressures of the respective stages to a pressure-reduction side according to the estimated adhesion amount $Q_{Wall}$, and the procedure comes out of a round of routine. If Step S313 determines that the adhesion amount $Q_{Wall}$ is less than the prescribed amount, the procedure comes out of the routine without making correction to the injection pressure in order to perform the injection with the unchanged injection pressure.

As described above, the present invention has been made in view of the fact that there primarily should be an injection pressure suitable for each injection in the case of the premixed compression ignition area II, in which the fuel injection timing is set to an earlier time point than the compression top dead center, and the fuel is injected in a plurality of stages. According to the control device for a diesel engine, the injection pressures divided into the respective early-injection stages are discretely set, so that the injection pressures Pi for the respective stages are not set to equal pressures as in conventional art, but can be set to pressures that vary depending on the respective injections.

Furthermore, the injection pressure Pi of each stage is adjusted for the gas density ρi and the gas temperature Ti in the corresponding cylinder. The fuel spray penetration that suits the actual conditions is thus taken into consideration. As a consequence, the injection pressure Pi of each stage is such pressure that does not cause fuel spray to adhere to the corresponding cylinder wall surface, and can be set to a highest optimum pressure.

Figure 9:
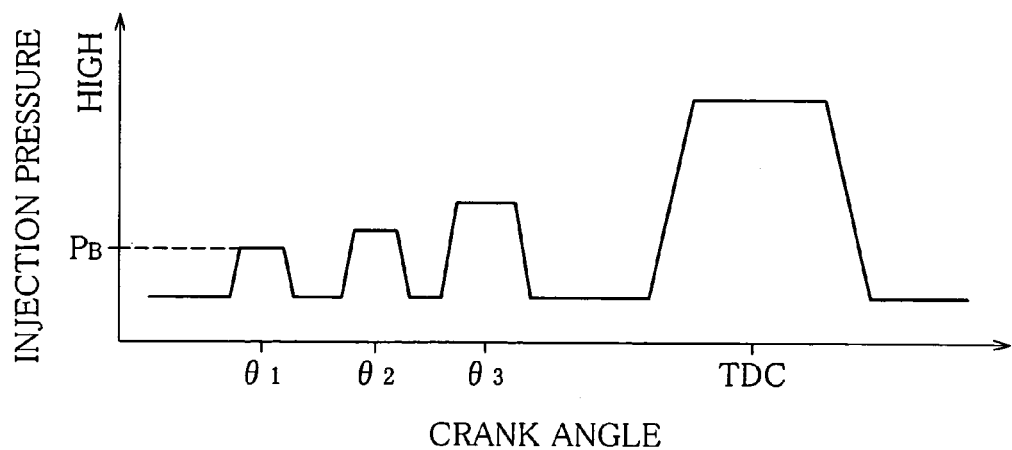
FIG. 9 is a view showing one example of the injection pressure and the injection frequency after correction by the ECU.

More specifically, FIG. 9 shows a time chart of the case in which the injection pressure and frequency are determined by the ignition control unit 82. Referring to FIG. 9, the early-injection frequency is set to three times by the frequency determination unit 86, and the injection is carried out at time points indicated by crank angles $θ_1$, $θ_2$ and $θ_3$ that are earlier than the compression top dead center.

According to the ignition control unit 82, when the piston position in the corresponding cylinder gets close to the compression top dead center, that is, when the cylinder capacity is gradually decreased, in order to prepare for the state in which the gas density ρi and the gas temperature Ti are increased by degree, and the like, the injection pressure at the time point of the crank angle $θ_1$ is set to a lowest pressure $P_B$ by the pressure control unit 84. As time passes to the time point of the crank angle $θ_2$ to that of the crank angle $θ_3$, the pressure is boosted little by little. It is therefore possible to perform the injection shown in the drawing by controlling the opening timing of the control valves 50 and 66 or the like. As a result of the individual setting of the injection pressure of each stage, the adhesion to the wall surface is prevented, which suppresses the oil dilution. Furthermore, it is possible to avoid incomplete combustion and to reduce smoke, so that the combustion efficiency can be upgraded.

The adhesion amount $Q_{Wall}$ is estimated from the total fuel quantity $Q_{ALL}$ and the combustion quantity $Q_{out}$, and the estimated adhesion amount $Q_{Wall}$ is reflected in the injection pressure Pi of each stage in real time by using the pressure control unit 84. Therefore, the injection pressure Pi can be set to the optimum pressure. Moreover, since the injection pressure Pi of each stage is so reduced that the adhesion amount $Q_{Wall}$ is less than the prescribed value, the adhesion amount $Q_{Wall}$ can be reduced as quickly as possible.

Furthermore, the early-injection frequency set by the frequency determination unit 86 is also determined in view of the fuel spray penetration that suits the actual conditions, and can be set to the optimum frequency.

The present invention is not limited to the above-described embodiment, and may be variously modified without deviating from the gist thereof.

For example, the embodiment describes the constitution in which the injection pressure is boosted from the reference value $P_B$ by means of the device having the common rail (FIG. 9). The present invention, however, is not necessarily limited to this embodiment. On the contrary, it is also possible, for example, that the reference value of the injection pressure is set to the pressure near the compression top dead center by using another fuel injector, and that the early injection pressure is reduced to be less than the reference value so that a waveform like the one shown in FIG. 9 is produced. In this case, as in the foregoing case, it is possible to set the optimum pressures that vary depending on the respective injections in view of the fuel spray penetration that suits the actual conditions.

The embodiment explains that the adhesion amount $Q_{Wall}$ is reduced by correcting the injection pressure. Apart from this embodiment, it is also possible to correct the total injection quantity $Q_E$ and the reference injection timing $θ_0$. Alternatively, an injection orifice of the injection valve 20 may be corrected. Moreover, when the adhesion amount $Q_{Wall}$ is calculated, a component containing carbon, such as HC and CO, in exhaust air may be detected instead of $CO_2$ concentration [$CO_2$]. By detecting HC or CO instead of $CO_2$, accuracy in estimating the adhesion amount $Q_{Wall}$ is enhanced.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a diesel engine, comprising:
   a diesel engine that injects fuel into air compressed in each cylinder to combust said fuel by spontaneous ignition, and control means for setting injection timing of said fuel to an earlier time point than compression top dead center to premix air and fuel, and combusting an air-fuel mixture compressed in the corresponding cylinder by spontaneous ignition, said control device wherein:
   said control means injects early-injected fuel in a plurality of stages depending on an operation state of said engine, and individually adjusts injection pressures of the respective stages according to gas density and gas temperature in said cylinder.

2. The control device for a diesel engine according to claim 1, wherein:
   said control means gradually increases the injection pressures of the respective stages as a piston position in the corresponding cylinder gets close to said compression top dead center.

3. The control device for a diesel engine according to claim 1, wherein:
   said control means sets injection frequency of the early-injected fuel according to a total injection quantity of the early-injected fuel that is injected toward the inside of said cylinder and addition amount of the injection quantity of each of said stages, which is found from the gas density and the gas temperature in said cylinder.

4. The control device for a diesel engine according to claim 1, wherein:
   said control means estimates a fuel quantity that is likely to adhere to the inside of said cylinder from a total fuel quantity injected toward the inside of said cylinder and a fuel quantity combusted in said cylinder, and corrects the injection pressures of the respective stages according to said estimated fuel quantity.

5. The control device for a diesel engine according to claim 4, wherein:

said control means corrects the injection pressures of the respective stages to a pressure-reduction side if said estimated fuel quantity that is likely to adhere to the inside of said cylinder is more than a prescribed value.

6. A method of controlling premixed compression ignition, which sets fuel injection timing to an earlier time point than compression top dead center to premix air and fuel, and combusts an air-fuel mixture compressed in each cylinder by spontaneous ignition, said method comprising the steps of:

calculating a total injection quantity of early-injected fuel that is injected toward the inside of the corresponding cylinder; and determining injection frequency of the early-injected fuel according to gas density and gas temperature in said cylinder, and calculating injection timing, injection quantities and injection pressures of respective stages.

7. The method of controlling the premixed compression ignition according to claim 6, comprising the steps of:

estimating a fuel quantity that is likely to adhere to the inside of the corresponding cylinder from a total fuel quantity injected toward the inside of said cylinder and a fuel quantity combusted in said cylinder; and correcting the injection pressures of the respective stages to a pressure-reduction side if said estimated fuel quantity that is likely to adhere to the inside of said cylinder is more than a prescribed value.

* * * * *